United States Patent
Huizing et al.

(10) Patent No.: US 7,710,310 B2
(45) Date of Patent: May 4, 2010

(54) DETECTION SYSTEM, METHOD FOR DETECTING OBJECTS AND COMPUTER PROGRAM THEREFOR

(75) Inventors: Albert Gezinus Huizing, Leiden (NL); Leonardus Johannes Hubertus Maria Kester, Delft (NL); Arne Theil, Voorburg (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 865 days.

(21) Appl. No.: 10/549,862

(22) PCT Filed: Mar. 25, 2004

(86) PCT No.: PCT/NL2004/000203
§ 371 (c)(1),
(2), (4) Date: Aug. 28, 2006

(87) PCT Pub. No.: WO2004/086083
PCT Pub. Date: Oct. 7, 2004

(65) Prior Publication Data
US 2007/0057837 A1    Mar. 15, 2007

(30) Foreign Application Priority Data
Mar. 25, 2003    (NL)    .................................. 1023016

(51) Int. Cl.
*G01S 13/86*    (2006.01)
(52) U.S. Cl. ............................. 342/52; 342/54; 342/55; 342/70; 342/75; 342/133; 342/139; 342/140; 342/141; 342/146; 342/158
(58) Field of Classification Search ............. 342/52–56, 342/70–72, 74–75, 133, 139–141, 146, 158; 701/301; 340/435–436, 903
See application file for complete search history.

(56) References Cited

U.S. PATENT DOCUMENTS 4,333,077 A * 6/1982 Teilhet ........................ 342/52

(Continued)

FOREIGN PATENT DOCUMENTS

EP    0 528 077 A1    8/1991

(Continued)

OTHER PUBLICATIONS

Nelson et al., "Sensor Fusion for Intrusion Detection and Assessment", SPIE vol. 2935, p. 57-67.

(Continued)

*Primary Examiner*—John B Sotomayor
(74) *Attorney, Agent, or Firm*—Varnum, Riddering, Schmidt & Howlett LLP

(57) ABSTRACT

A detection system (1) having an optical sensor (3), a radar device (2) and a signal processor (4) communicatively connected with the optical sensor and the radar device. The signal processor comprises: a first detector (41, 410-413) for detecting a first object on the basis of a first signal coming from the optical sensor and determining at least one first property of the first object; a second detector (42, 420-421) for detecting a second object on the basis of a second signal coming from the radar device and determining at least one second property of that second object, and a signaling unit (43) for producing a signal if the at least one first property and the at least one second property satisfy a predetermined condition. Further, a method for detecting objects, comprising: generating (100) a sensor signal with an optical sensor; detecting (101) a first object on the basis of the sensor signal; generating (200) a radar signal; detecting (201) a second object on the basis of the radar signal; producing (300) a detection signal if both on the basis of the sensor signal and on the basis of the radar signal the same object is detected. Also, a computer program with program code for performing one or more steps of such a method.

26 Claims, 2 Drawing Sheets

U.S. PATENT DOCUMENTS

| | | | | |
|---|---|---|---|---|
| 4,622,554 | A | * | 11/1986 | Gellekink et al. ............ 342/67 |
| 5,479,173 | A | | 12/1995 | Yoshioka et al. |
| 6,061,014 | A | | 5/2000 | Rautanen et al. |
| 6,225,955 | B1 | | 5/2001 | Chang et al. |
| 7,030,775 | B2 | * | 4/2006 | Sekiguchi ................ 340/903 |
| 2004/0145511 | A1 | * | 7/2004 | Klausing et al. ............ 342/52 |
| 2007/0057837 | A1 | * | 3/2007 | Huizing et al. .............. 342/52 |

FOREIGN PATENT DOCUMENTS

| | | |
|---|---|---|
| EP | 0 822 423 A2 | 7/1997 |
| FR | 2 791 437 A1 | 3/1999 |
| JP | 2005005978 A * | 1/2005 |
| JP | 2005156199 A * | 6/2005 |
| JP | 2005215964 A * | 8/2005 |
| JP | 2005216200 A * | 8/2005 |
| WO | WO 2004086083 A1 * | 10/2004 |

OTHER PUBLICATIONS

Kester et al., "Fusion of Radar and EO-sensors for Surveillance", Proceedings of SPIE vol. 4380 (2001), p. 462-471.

Theil et al., "The Fresnel Program: Fusion of Radar and Electro-optical signals for Surveillance on Land", Proceedings of SPIE vol. 4380 (2001), p. 453-461.

* cited by examiner

DETECTION SYSTEM, METHOD FOR DETECTING OBJECTS AND COMPUTER PROGRAM THEREFOR

CROSS REFERENCE TO RELATED APPLICATIONS

This application claims priority of Netherlands Patent Application No. 1,023,016 dated Mar. 25, 2003.

BACKGROUND OF THE INVENTION

This invention relates to a detection system and to a method and a computer program for detecting objects.

American patent publication U.S. Pat. No. 6,061,014 discloses a surveillance method for wide areas. According to this method, a thermal camera and a radar device are utilized, which scan an area. Movements in the area are detected by the radar device, while objects differing from the environment in temperature, such as people, are detected with the camera. In one embodiment, after detection of an object with the radar device, the object is identified with the thermal camera and subsequently an alarm can be generated, for instance if the object is a moose or a wolf.

A drawback of this known method is that the detection of objects does not work satisfactorily, because it involves a high chance of false alarm. For instance, an object that is not of interest (for instance birds) may be signaled, or owing to noise non-existing objects may be detected.

SUMMARY OF THE INVENTION

It is an object of the invention to provide a detection system that leads little, at least less so than the known devices do, to false signaling of objects. To that end, the invention provides a detection system according to claim 1.

With a system according to the invention, few or no instances of incorrect signaling of objects are generated, for the objects detected on the basis of the first signal and the objects detected on the basis of the second signal are compared and tested against a predetermined condition, so that a physical object is only signaled if the detected objects from the two signals agree with each other to a sufficient extent.

Moreover, with a detection system according to the invention, objects can be described on the basis of features that are furnished both by the camera and by the radar. As a consequence, more information about the object is obtained, because with the optical sensor, types of features of the object can be determined which partly differ from the types of features that can be determined with the radar device.

The invention further provides a method according to claim 14. With such a method, objects can be detected in a reliable manner. The invention further provides a computer program according to claim 25. With such a program, a programmable device, such as for instance a computer or the like, can be arranged to detect objects in a reliable manner.

It is to be noted that the American patent publication U.S. Pat. No. 5,479,173 discloses an apparatus for in a vehicle, for detecting obstacles. The apparatus comprises a radar device and a camera. The radar device is arranged for detecting objects, while the camera is arranged to determine the route of the vehicle. The apparatus can predict the route of a detected object on the basis of data from the radar device and compare these with the route of the vehicle, so that possible collisions between the vehicle and the object can be determined.

Further, the French patent publication FR 2 791 473 discloses a device for recognizing a flying object. On the basis of objects detected with a radar, a camera is aimed at the object, so that a user of the device can identify the detected object.

Also, the European patent publication EP 0 528 077 discloses an air radar system with a camera for monitoring flying objects. The system comprises a radar device with which the objects can be detected. The system further has means to make images, so that the objects detected by the radar can be identified.

The devices known from these three patent publications, however, have a similar drawback to that of the method known from the American patent publication U.S. Pat. No. 6,061,014. The fact is that the detection of objects is not accurate, for instance because an object may be signaled which is not of interest (for instance birds), or non-existing objects may be detected owing to noise.

Specific embodiments of the invention are laid down in the dependent claims. Further details, aspects and embodiments of the invention will be discussed hereinafter on the basis of the examples represented in the drawing.

DETAILED DESCRIPTION

Figure 1:
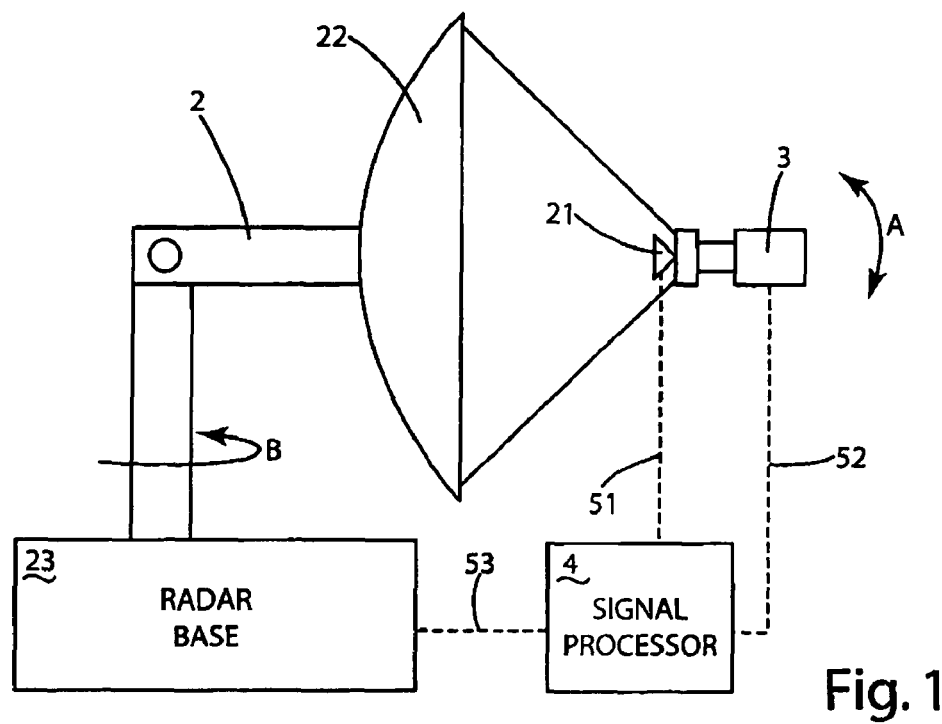
FIG. 1 schematically shows an example of an embodiment of a detection system according to the invention.

FIG. 1 schematically shows an example of an embodiment of a detection system according to the invention. The detection system 1 comprises a radar device 2 and an optical sensor, in the example shown a camera 3. The radar device 2 and camera 3 are communicatively connected with a signal processor 4, as is indicated in the Figure by the broken lines 51 and 52. Via the communicative connection 52, the camera 3 can send to the signal processor 4 a first signal which represents a camera measurement performed by the camera. Via the communicative connection 51, the radar device 2 can send to the signal processor 4 a second signal which represents a radar measurement performed by the radar.

Figure 2:
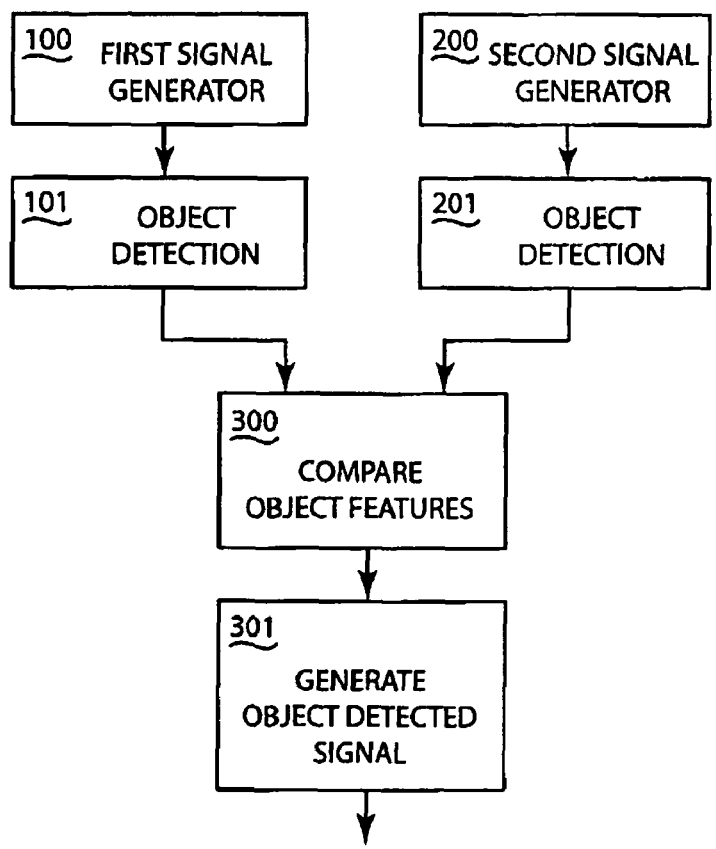
FIG. 2 schematically illustrates in a flow diagram an example of a method according to the invention.

The example of a detection system 1 in FIG. 1 is suitable for carrying out a method for detecting objects according to the invention. An example of a method according to the invention is shown in FIG. 2. In step 100, a first signal is generated, which represents an optical measurement, such as, for instance, a recording of a video camera or an infrared camera. In step 200, a second signal is generated, which represents a radar measurement, such as, for instance, a radar recording from the radar device 2 in the example of FIG. 1. In step 101, from the first signal, that is, from the camera measurement, one or more objects are detected, and properties of the detected objects are determined, such as, for instance, assuming that the object is surface-bound, the distance between the object and camera, the size of the object, the color of the object or the like.

In step 201, the signal processor 4 likewise detects from the second signal, that is, from the radar measurement, one or more objects and also determines the properties thereof, such as, for instance, the reflective power, the radial velocity, the width of the Doppler spectrum, and the like.

Next, in step 300, the signal processor 4 compares one or more features of the objects detected from the two signals. The signal processor can examine, for instance, whether the distance of the objects to the camera 3 and radar device 2, respectively, is such that the objects have the same position. If the detected objects have the same position (or in any case are located sufficiently close to each other), there is a very high probability that the same physical object is involved. If the compared features satisfy a predetermined condition, for instance if the difference in position is below a particular value, the signal processor in step 301 produces a signal indicating that a physical object has been detected by the system.

Figure 3:
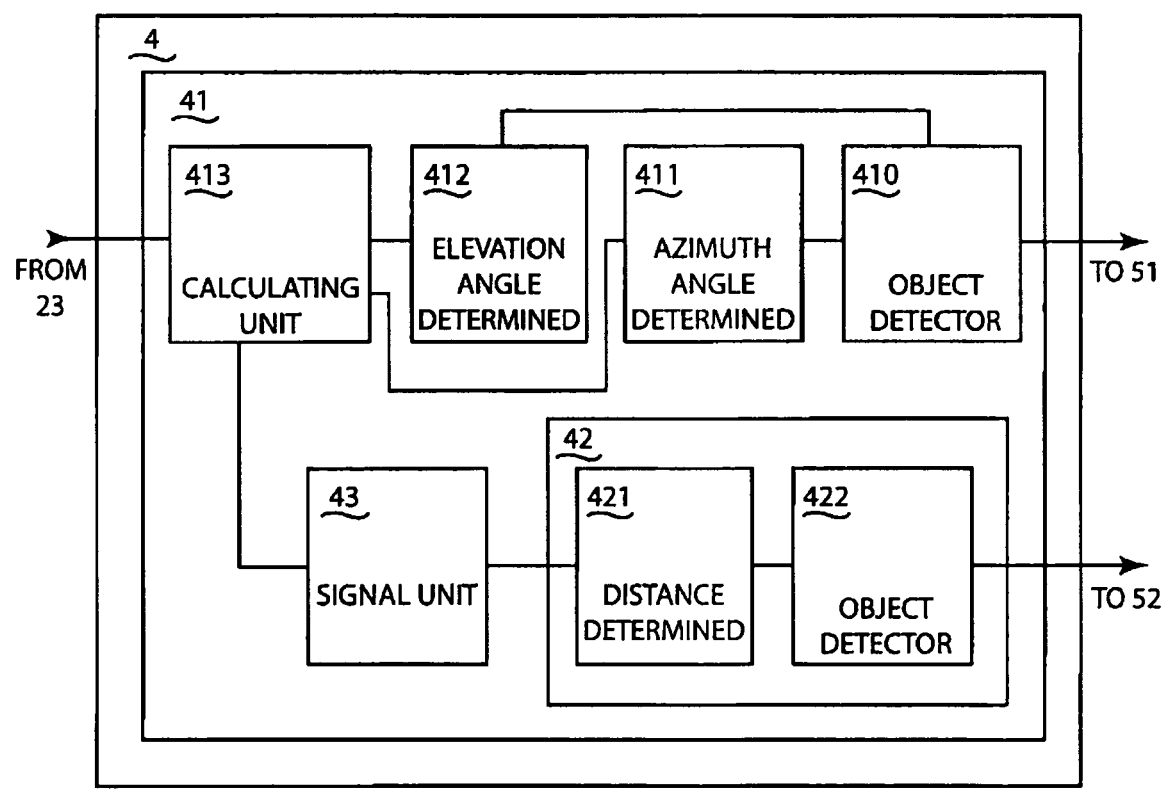
FIG. 3 shows a block diagram of an example of a signal processor for use in a detection system according to the invention.

FIG. 3 shows the signal processor 4 in more detail. The signal processor 4 has a first detector 41 and a second detector 42 to detect from the first signal and the second signal, respectively, objects and features of the objects. The detectors 41 and 42 are communicatively connected with a signaling unit 43. The signaling unit 43 produces a signal if one or more features of the objects from the first signal and one or more features of the objects from the second signal satisfy a predetermined condition. The first detector 41 comprises an object detector 410 which can detect the presence of an object from the first signal. In the example shown, the first detector 41 further has an azimuth angle determining unit 411 and an elevation angle determining unit 412 for determining the azimuth angle and the elevation angle, respectively, of a detected object. The angle determining units are communicatively connected with the object detector 410 and a calculating unit 413. The calculating unit can determine the distance between the detected object and the camera 3 from the elevation and azimuth angles. The determination of this distance can be derived, for instance using goniometric algorithms, from the height of the camera relative to the ground and the angles mentioned. Such a distance determination is known per se and is not further elucidated here for the sake of brevity.

In the example shown, the radar device 2 and the camera 3 are movable, and the device shown can operate in a scanning fashion, whereby the radar device 2 and the camera 3 are moved and in each case observe a different part of an area. Such a movement can be, for instance, a translating, rotary or other movement. The movement may be a reciprocating movement, whereby the radar device 2 and the camera 3 move back and forth between a first and a second position. The movement can also be a circulatory movement. The calculating unit 413 is communicatively connected with position determining means in a base 23 of the radar device, which can pass on the position and viewing direction of the camera to the calculating unit 413 for determining the distance between the camera and the detected object. However, the radar device 2 and the camera 3 can also be used in a fixed position, that is, in a non-scanning fashion. The position determining means, or orientation determining means, can then be omitted.

The second detector 42, connected with the radar device, likewise comprises an object detector 420 which can detect an object from the radar measurement, that is, from the second signal. The object detector 420 is communicatively connected with a distance determining unit 421 which can determine the distance from the object detected from the second signal to the radar device. The determination of the distance of an object from a radar signal is known per se and is not further elucidated here for the sake of brevity.

It is noted that the first detector 41 and/or the second detector 42 may further comprise, in addition to the devices shown in FIG. 3, other devices for determining other features of a detected object, such as, for instance, the shape, or for instance the temperature if the optical sensor comprises a thermal camera.

The distance determining unit 421 and the calculating unit 413 are connected with the signaling unit 43 which compares the features of one or more objects from the camera measurement and/or one or more objects from the radar measurement with each other. In case the camera 3 observes one or more objects, while the radar device 2 at the same time likewise observes one or more objects, the detectors 41 and 42 thus yield two sets of measurements, a camera set and a radar set. The signaling unit 43 compares the two sets of measurements with each other. For instance, the signaling unit can compare the distances from the camera set with the distances from the radar set. If a distance from the camera set does not match any one of the distances from the radar set, the camera measurement associated with the distance is rejected. A set of distances from a camera set and the radar set can for instance be considered as matching by the signaling unit 43 if the difference in distance between the distances from the two sets is less than a specific threshold value, which, for instance, may be entered by an operator of the detection system. Accordingly, when the radar set is empty, that is, if no objects have been detected with the radar, all camera measurements are rejected.

If both radar and camera observe a flying object (hence, not surface-bound), the distances derived from the camera set and the radar set will not match, because the distance calculated from the camera measurement is based on the height of the camera position relative to the ground and not a difference in height between the camera and the object. Measurements on flying objects are therefore rejected.

If the distances do match, the radar features and the camera features can be combined, thereby yielding a more complete description of the object. In that case, the distance obtained with the camera can be replaced by the distance obtained with the radar, since the latter is generally more accurate.

In the literature, different techniques are described to combine the radar and camera data. A customary approach if the sensors are not mutually synchronized is a so-called tracking process. Radar and camera measurements are then linked (associated) with one or more 'tracks', a track representing estimates of particular object features. A description of an example of such a method which can be advantageously used in a system or method according to the invention is known, for instance, from L. J. H. M. Kester, A. Theil, "*Fusion of Radar and EO-sensors for Surveillance*", SPIE Conference 4380, April 2001.

If in the first signal an object is detected and for that object one or more of the features from the first signal agree with one or more features of an object that has been found in the second signal, the signaling unit 43 in signal processor 4 produces a signal. For instance, the signaling unit produces an alarm signal in a human-perceptible form, warning against unwanted intruders. It is also possible that the signaling unit 43 sends a signal to another device, for instance the control for a door, so that the door is locked by the signal. The signal can also contain a combination of the features of the object from the first signal and the features of the object from the second signal, so that a description of the detected physical object is obtained that includes information from both the camera measurement and the radar measurement. Through this combination, a detailed description of the physical object is obtained, which can be represented, for instance, on a display.

If for an object which has been detected from the first signal no object from the second signal is found having sufficient corresponding features, the object from the first signal is regarded by the signal processor as not detected. If desired, the signal processor may be of such design that a signal is produced in that case too, so that a user can further investigate the incorrect detection from the first signal.

It is also possible that the signaling unit 43 can control an optical sensor and, for instance, can collect supplemental information about the detected object. For instance, as known from the American patent publication U.S. Pat. No. 6,061, 014, the object can be classified with a thermal camera and subsequently an alarm can be produced if the object falls into a particular class.

The signal processor 4 shown in FIG. 3 has a synchronization, as a result of which detection is done on the basis of measurements performed at the same time. The synchronization can have been obtained, for instance, by providing the signals of the radar device 2 and the camera 3 with information about the time of measurement. The detectors 41 and 42 can then verify mutually whether detection is performed on the basis of signals or measurements of the same time. It is also possible, however, to obtain the synchronization in a different manner, for instance by designing the detection system 1 in such a way that between the camera and the signal processor the same time delay is present as between the radar device and the signal processor, and the camera and radar device perform measurements simultaneously. Accordingly, the same period of time elapses between the detection of objects from the camera and the radar device, respectively, and the generation of the camera signal and radar signal, respectively, so that the signals and objects can be simply combined.

In the example of a system according to the invention in FIG. 1, the radar device 2 comprises a dish antenna 22 provided with a feedhorn 21. The feedhorn 21 is situated near or in the focal point of the dish 22. Such radar devices and their operation are generally known.

In the example shown, the camera 3 is situated near the radar device 2 and the camera 3 is mounted on the feedhorn 21 of the radar device 2. As a result, the field of regard of the camera and the field of regard of the radar overlap at least partly. Preferably, the fields of regard coincide wholly or largely. Fields of regard that coincide (largely) enhance reliability of detection, because this prevents a camera measurement being wrongly not censored if the radar device observes an object at the same distance from the object observed by the camera, but outside the camera's field of regard. When the camera and the radar device both detect an object at the same distance, but the camera detects this object outside the field of regard of the radar device, the detection can still be rejected through the camera azimuth.

Also, the viewing direction of the camera is parallel to the viewing direction of the radar device, and the fields of regard of the camera and the radar device coincide, so that by definition an object that is found at a particular distance according to the camera information will also have to be found at that distance by the radar information. If these distances exhibit too large a deviation, the object is regarded by the signal processor 4 as not detected. Moreover, there is no need for conversion between a coordinate system for the camera 3 and a system for the radar device 2, which makes a considerable difference as regards the calculating capacity heeded for the signal processor.

As is indicated with the arrows A and B, the radar device 2 and the camera 3 are pivotable relative to the earth. As a result, the radar device 2 and camera 3 can be deployed in a scanning mode, for instance through rotation or a reciprocating movement, in order to cover a wider area. In the example shown, a base 23 of the radar device 2 includes a driving device (not shown), which is controlled by the signal processor 4 via a communicative connection 53. Also via the connection 53, information about the orientational position of the radar device 2 and the camera can be sent to the signal processor 4, so that the signal processor can make an accurate determination of the position of detected objects. As described hereinbefore, however, a detection system according to the invention can also be designed with a stationary radar device and a stationary optical sensor, both fixed in a particular (orientational) position.

The optical sensor can be of any suitable type and can be, for instance, a digital photo camera or a video camera. The optical sensor camera can work in any suitable frequency range, as for instance in the visible, infrared or ultraviolet range.

An apparatus or method according to the invention can be used, for instance, for automated terrain surveillance. In designs nowadays found in practice for electronic surveillance of premises or buildings, in most cases one or more cameras are used to establish the presence of an intruder. An attendant drawback is that often so-called false alarms are generated, that is, alarm signaling events caused by objects that are not of interest (for instance birds), or by noise. Accordingly, often a human operator is needed who interprets the sensor information and who decides whether an intruder is entering the terrain under surveillance. With an apparatus or method according to the invention, the number of false alarms is reduced because information coming from both a radar system and a camera is combined. Thus, surveillance can be dealt with in a completely automated fashion.

Further, it is possible with a computer program according to the invention to render a programmable device, such as, for instance, a computer or the like, suitable for carrying out a method according to the invention or to arrange it as a signal processor according to the invention. A computer program according to the invention comprises a program code for performing one or more steps of a method according to the invention, when the program has been loaded into the programmable device. Self-evidently, the programmable device should be communicatively connectible to a radar device and an optical sensor device in order to receive the first and the second signal. The computer program may be loaded on a data carrier provided with data representing the computer program.

It is noted that the invention is not limited to the above-described examples. After reading the foregoing, different variants will be obvious to those skilled in the art. In particular, it is obvious to design a detection system according to the invention with several optical sensors and/or several radar devices. Also, it is obvious to combine a detection system according to the invention with other sensors, such as, for instance, vibration or motion sensors or acoustic sensors, such as a directional microphone. Further, it is obvious to design the signal processor to be physically present at different places while functionally forming one whole. For instance, the detection of objects from the signals can be (partly) performed near the optical sensor or the camera, while comparison of features of the detected objects can be performed remotely, for instance by a central computer. Furthermore, it is obvious to use in the radar device a so-called lidar (light detection and ranging) device. Also, the radar device may be designed differently, for instance comprising, instead of a dish antenna, a flat antenna, also called patch antenna. Furthermore, it is noted that the term 'comprising' does not preclude the presence of other elements besides the elements mentioned.

The invention claimed is:

1. A detection system (1), comprising:
an optical sensor (3);
a radar device (2); and
a signal processor (4) communicatively connected with the optical sensor and the radar device, the signal processor comprising:
a first detector (41, 410-413) for detecting a first object on the basis of a first signal coming from the optical sensor and determining at least one first property of the first object;
a second detector (42, 420-421) for detecting a second object on the basis of a second signal coming from the radar device and determining at least one second property of that second object,
a signaling unit (43) for producing a signal if the at least one first property and the at least one second property satisfy a predetermined condition;
a first distance determinator configured to determine from the first signal a first distance between the first object and the optical sensor;
a second distance determinator configured to determine from the second signal a second distance between the second object and the radar device; and
said signaling unit produces a signal if the difference between the first and second distances satisfies a predetermined condition.

2. A detection system (1) according to claim 1, wherein the signaling unit further produces a signal if the first object and the second object correspond to each other to a sufficient extent.

3. A detection system (1) according to claim 1, wherein the signal processor (4) further comprises:
an angle calculating device (411, 412) configured to determine from the first signal the distance from the first object to the optical sensor (3) with the aid of an elevation angle and an azimuth angle of the detected object relative to the optical sensor (3).

4. A detection system (1) according to claim 1, wherein the signal processor (4) further comprises:
a further distance determinator configured to produce a distance signal if the first and second distances correspond to each other to at least a predetermined extent, which distance signal represents the distance determined from the second signal.

5. A detection system (1) according to claim 1, wherein the signal processor (4) further comprises:
a signal producer device configured to produce a signal if the first object and the second object correspond to each other to at least a predetermined extent, and the second object, on the basis of information derived from the second signal, is situated on the surface of the earth.

6. A detection system (1) according to claim 1, wherein:
the optical sensor (3) has an optical field of regard; and
the radar device (2) has a radar field of regard, which fields of regard overlap each other wholly or partly.

7. A detection system (1) according to claim 6, wherein the viewing direction of the optical sensor (3) and the viewing direction of the radar device (2) substantially parallel.

8. A detection system (1) according to claim 1, wherein the optical sensor (3) and the radar device (2) are arranged in mutual proximity.

9. A detection system (1) according to claim 8, wherein the radar device (2) comprises a dish antenna (22) with a feedhorn (21), and the optical sensor (3) is mounted on or new the feedhorn.

10. A detection system (1) according to claim 1, wherein the optical sensor (3) and the radar device (2) are pivotably arranged and wherein the detection system further comprises a driving device configured to cause the optical sensor and the radar device to pivot or rotate.

11. A detection system (1) according to claim 1, wherein in the signal path between the optical sensor (3) and the signal processor (4), and in signal path between the radar device (2) and the signal processor, substantially the same time delay is present.

12. A detection system (1) according to claim 1, wherein the optical sensor comprises a camera (3).

13. A method for detecting objects, comprising:
generating (100) a sensor signal with an optical sensor;
detecting (101) a first object on the basis of the sensor signal, the detecting of the first object comprising determining from the sensor signal a distance between the first object and the optical sensor;
generating (200) a radar signal;
detecting (201) a second object on the basis of the radar signal, the detecting of the second object comprising a determining from the radar signal a distance between the second object and the radar device; and
producing (300) a detection signal if both on the basis of the sensor signal and on the basis of the radar signal the same object is detected, wherein the producing of the detection signal comprises the producing of a distance signal if the distance between the distance determined from the distance signal and the distance determined from the first signal satisfies a predetermined condition.

14. A method according to claim 13, wherein producing (300) a detection signal comprises:
producing a detection signal if the first object and the second object correspond to each other at least to a predetermined extent.

15. A method according to claim 13, wherein determining from the first signal a distance between the first object and the optical sensor comprises:
determining from the first signal the distance from the first object to the optical sensor (3) with the aid of an elevation angle and an azimuth angle of the detected object relative to the optical sensor (3).

16. A method according to claim 13, where producing (300) a detection signal comprises:
producing a distance signal if the two distances correspond to each other at least to a predetermined extent, which distance signal represents the distance determined from the second signal.

17. A method according to claim 13, wherein producing (300) a detection signal comprises:
producing a detection signal if the first object and the second object correspond to each other at least to a predetermined extent and the second object, on the basis of information derived from the second signal, is situated on the surface of the earth.

18. A method according to claim 13, wherein the optical sensor (3) has an optical field of regard and the radar device (2) has a radar field of regard, which fields of regard overlap each other wholly or largely.

19. A method according to claim 18, wherein the viewing direction of the optical sensor (3) and the viewing direction of the radar device (2) are held substantially parallel.

20. A method according to claim 13, wherein the optical sensor (3) and the radar device (2) are used whilst arranged in mutual proximity.

21. A method according to claim 20, wherein the radar device (2) comprises a dish antenna (22) with a feedhorn (21), and the optical sensor (3) is arranged on or near the feedhorn.

22. A method according to claim 13, wherein the optical sensor (3) and the radar device (2) are pivoted.

23. A method according to claim 13, wherein between generating (100) a sensor signal and detecting (101) a first object, and between generating (200) a radar signal and detecting (201) a second object, the same period of time elapses.

24. A method according to claim 13, wherein an optical sensor is used which comprises a camera (3).

25. A method according to claim 13, wherein the steps of the method are performed using a computer program comprising program code loaded into a programmable device.

26. A method according to claim 25, wherein the method uses a data carrier provided with data representing the computer program.

* * * * *